UNITED STATES PATENT OFFICE.

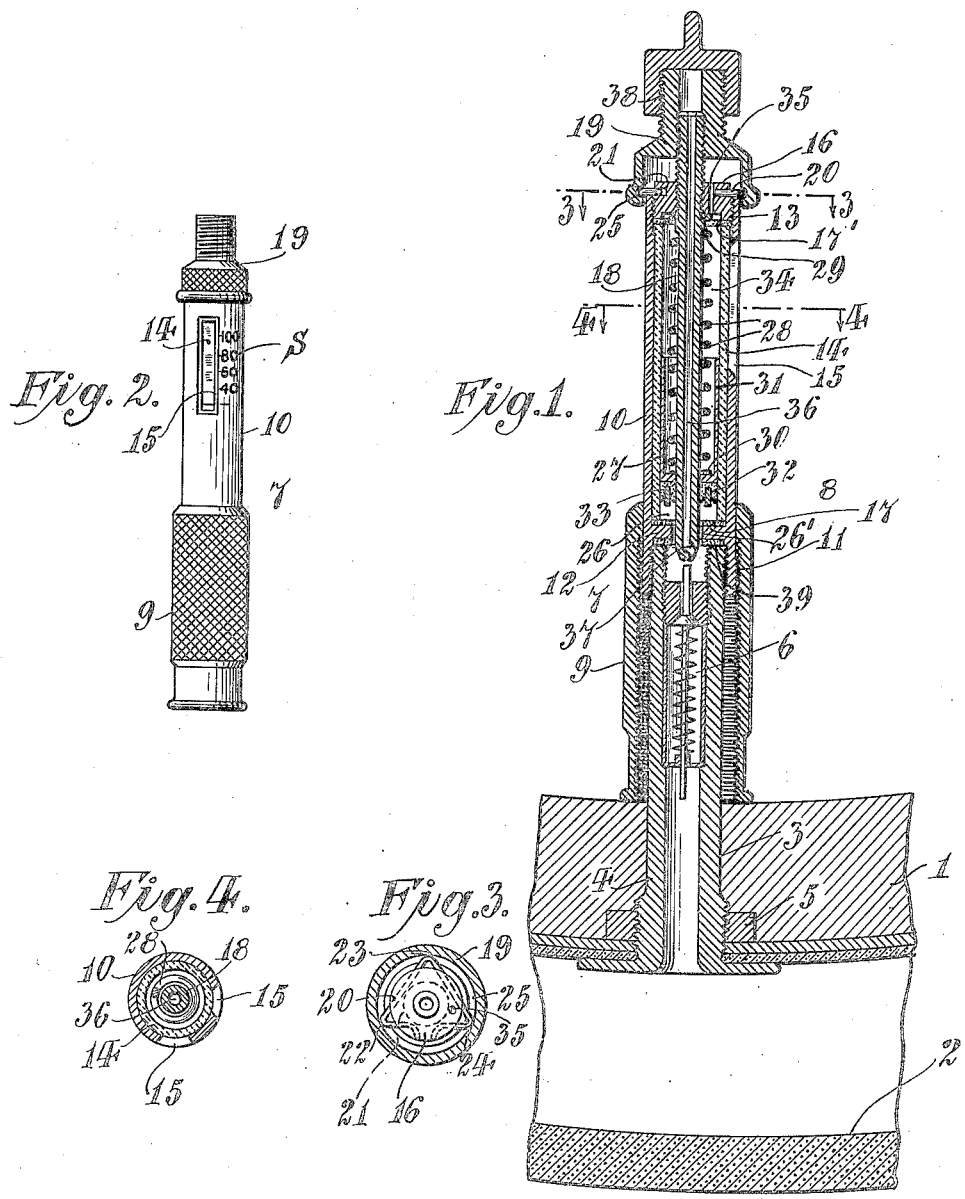

EVARTS G. LOOMIS, OF NEWARK, AND ARTHUR V. DA COSTA, OF ARLINGTON, NEW JERSEY.

PRESSURE-GAGE.

1,276,089.  Specification of Letters Patent.  Patented Aug. 20, 1918.

Application filed July 27, 1915. Serial No. 42,175.

*To all whom it may concern:*

Be it known that we, EVARTS G. LOOMIS and ARTHUR V. DA COSTA, citizens of the United States, and residents, respectively, of Newark, county of Essex, and State of New Jersey, and of Arlington, county of Hudson, and State of New Jersey, have invented certain new and useful Improvements in Pressure-Gages, of which the following is a specification.

The present invention relates to pressure gages and it is particularly adapted to devices of the class which are employed for determining the pressure within pneumatic tires on automobiles.

The gage is preferably constructed so that it can be left in place on the wheel, if desired. It is also constructed so that the air which is supplied to the interior of the tire will pass through the pressure gage. The pressure gage is furthermore preferably constructed so that air can be supplied to the interior of the tire from a supply pipe merely by removing a small tip or cap that is upon the pressure gage and securing the supply tube to the pressure gage.

The invention furthermore relates to a pressure gage which is or may be connected—permanently so to speak—to the stem of the tire. The construction is preferably such that the air being forced into the tire first passes through a central stem, thence past an air valve in the stem of the tire. The central stem just referred to is adjustable so that it can be moved to a position to open the air valve whereby communication will be opened between the air space in the tire on the one hand and the gage on the other. When the central stem just referred to is withdrawn the air valve in the stem of the tire will automatically close and the communication between the air space in the interior of the tire and the pressure gage will be closed. In other words, the air valve in the stem of the tire is normally closed and no air is allowed to escape through the gage for the reason that the air valve in the stem normally closes any communication from the interior of the tire to the gage.

As showing a specific embodiment of the invention reference is made to the accompanying drawing forming a part of this specification and in which drawing, Figure 1 shows in section a portion of a wheel with a portion of the tire thereupon and the pressure gage secured in place.

Fig. 2 is an external view of the pressure gage.

Fig. 3 is a view taken along the line 3—3 of Fig. 1 looking in the direction of the arrows; and Fig. 4 is a view taken on the line 4—4 of Fig. 1 looking in the direction of the arrows.

The wheel 1 is provided with any suitable pneumatic tire 2. This tire has the usual stem 3 frequently referred to herein as the valve stem. This stem comprises an inner member 4 and outer member 5, and in the inner member of this stem there is located the usual air valve 6 that normally prevents the flow of air from the interior of the tube through the stem. The pressure gage 7 is preferably constructed so that it can be secured in place and left in its secured position on the wheel even when the wheel is being used. This pressure gage is also constructed, as will hereinafter appear, so that the reading of the pressure within the tire can be readily ascertained at any time.

The pressure gage comprises an outer shell 8 having as one member thereof a sleeve 9 that serves as a locking nut, and as another member a slotted barrel 10. The barrel 10 is screwed directly upon the small threaded end of the inner member 4 of the valve stem 3 while the sleeve 9 has a screw connection at 11 with the slotted barrel 10 whereby when the slotted barrel is in place the sleeve can be screwed down to engage the inner portion of the rim of the wheel, or at least a washer or nut that is on the stem, should there be such a washer or nut located so as to engage the inner side of the rim. The sleeve, when screwed down in this manner, will cover the stem 3 so that no portion thereof will be exposed and when in this position the sleeve serves to lock the barrel against rotation thus performing the function of a locking nut.

The slotted barrel 10 is provided with an inner flange or shoulder 12 at or adjacent to its lower end and with screw threads 13 at its upper end. A transparent cylinder 14, preferably a piece of glass tubing, is located in the slotted barrel 10, the slots in the latter being designated as 15, and this transparent cylinder is held in place in the slotted barrel by means of a nut or plug 16. This transparent cylinder may be considered as the lining of the slotted barrel and the slotted barrel and the transparent cylinder or tubing 14 constitute what may be considered as a cylinder within which the piston, hereinafter referred to, slides. The cylinder within which the piston slides, to wit, the slotted barrel and its lining, may be considered as constituting a part of the shell that is attached to the stem of the tire. A suitable packing is provided at 17, between the shoulder 12 and lower end of the transparent cylinder 14, so as to prevent the leakage of air between them. A packing or washer 17' may also be provided between the upper end of the transparent cylinder 14 and the nut or plug 16 so as to prevent the breaking of the transparent cylinder when the latter is clamped between the shoulder 12 on the one hand and the nut or plug 16 on the other. An inner tube 18—or what may be referred to as an adjustable central stem because it can be utilized to open the valve 6 when desired—is screwed into the nut or plug 16, and from an inspection of the drawing it will be observed that this tube or stem is located within the transparent cylinder 14. A cap 19, hereinafter referred to as an adjusting cap, is screwed upon the upper end of the tube 18 and is secured to the latter so that the two will rotate together whereby by merely rotating the adjusting cap the inner tube or adjustable stem will be moved longitudinally toward or from the valve 6 in a manner to forcibly open the valve or to permit the latter to assume closed position. A spring 20 is located in a recessed portion 21 of the nut or plug 16 and this spring is shaped in the form of a triangle so that the corners 22, 23 and 24 will enter a recessed portion 25 of the cap 19, thus serving as a locking spring to prevent the cap 19 and the inner tube 18 from becoming displaced by jarring. The inner tube 18 is of such a length as above indicated that it can be made to engage the valve 6 and thus force it to open position whereby the air is free to flow in either direction past the valve. In other words, when the valve is held open air is free to pass from the inner tube 18 past the valve into the tire during the filling of the latter or from the tire past the valve through the space 26' that is between the inner tube and the shoulder 12 on the slotted barrel into the chamber 26. The chamber 26 thus mentioned is the chamber located in the transparent cylinder 14 at the forward end of a piston 27. When the air enters this chamber 26 it forces the piston upwardly against the pressure of a coil compression spring 28 one end of which is seated on the under side of the nut or plug 16 and the other or lower end of which presses against the rear face 30 of the piston. This piston has a comparatively long rearwardly extending sleeve 31 that surrounds a portion of the spring 28 and is of such a length that it can coöperate with the scale markings S that are on the exterior of the slotted barrel 10 whereby a reading of the pressure within the tire can be readily ascertained. In order that there may be no leakage of air from the chamber 26 past the piston an annular washer 32 U-shaped in cross section is provided at the forward or lower end of the piston and from an inspection of the drawing it will be observed that this annular washer contacts with both the interior of the transparent cylinder 14—or in other words what may be considered as the interior portion of the shell 8—and the exterior of the inner tube 18. To insure the retaining of the washer U-shaped in cross section a ring 33 may be provided. The space 34 within the transparent cylinder 14 above the piston 27 decreases as the piston is forced upward and in order that this upward force will be resisted only by the force of the compression spring 28 the parts are constructed so that air can flow freely from the space 34. This may be accomplished by making the joint between the nut or plug 16 and the slotted barrel 10 a loose fit, or there can be provided a vent hole, as at 35, in the nut or plug 16. Another loose fit is provided between the adjusting cap 19 and the exterior of the slotted barrel 10, through which the air can escape. The lower end of the inner tube 18 is the part which engages the valve 6. In order that the passageway 36 in the tube 18 will not become obstructed by the valve 6 the lower portion of the tube is provided with a laterally extending opening, as at 37, which constitutes a portion of the passageway that extends substantially the full length of the tube and it is through this passageway that the air can be supplied, from the supply pipe which is secured at 38 to the adjusting cap 19, to the interior of the valve stem 3. To prevent any leakage between the shoulder 12 on the one hand and the upper end of the outer member 4 of the valve stem a suitable washer, as at 39, may be provided.

The adjustable stem or central member 18 has a shoulder 29 which limits its rearward or upward movement, that is, its movement away from the air valve 6. As previously indicated, the air supplied to the tire preferably passes through the stem 18, but it is to be understood that one of the principal functions of this adjustable stem is to provide a means for depressing or releasing the air valve in the tire stem so as to open or close communication between said gage and the air space in the tire, thus throwing the gage in and out of operation at will. However, according to some embodiments of the invention the air could be otherwise supplied to the space between the air valve 6 and the gage.

The glass tube serves to protect the parts which are located within the barrel from the dust and allows any markings on the rearwardly extending sleeve 31 to be seen through the glass tube or cylinder 14. This glass tube in effect serves as a lining for the slotted barrel and the two together form what may be considered as a cylinder within which the piston 27 is located.

The improvements herein set forth are not limited to the precise construction and arrangement shown and described, as they may be embodied in various forms and modifications without departing from the spirit and scope of the invention.

What is claimed is:

1. A pressure gage for attachment to a valve stem which pressure gage comprises in combination a shell having a barrel with a cylindrical portion, a nut on said barrel, an inner tube carried by said nut in a manner that will permit the inner tube to be moved longitudinally relative to the shell, which tube extends longitudinally within the barrel, a sliding piston within said barrel, an annular packing U-shaped in cross-section at the forward end of said packing, which packing slidably engages the cylindrical portion of the barrel and the exterior of said inner tube, and a compression spring one end of which engages the rear portion of said piston, there being a passageway between the exterior of the inner tube and the cylindrical portion of the barrel to permit air to enter the space in the cylindrical portion at the forward end of the piston, the shell being the part which is attached to the valve stem and the inner tube being positioned so that by moving it longitudinally the air valve in the stem can be opened.

2. In combination with the stem of a tire, which stem has an air valve associated therewith so as to normally prevent the flow of air from the interior of the tire, a pressure registering device comprising a shell that engages the stem, which shell includes a cylindrical portion and a slotted portion, a nut member on the upper end of the slotted portion of the shell, an inner tube carried by said nut member, which tube extends into the shell, a piston located in the space between the inner walls of the cylindrical portion of the shell and the outer surface of the inner tube, and a compression spring which engages the rear face of the piston so as to force it forwardly toward the lower end of the inner tube, the inner tube being open at the forward or lower end thereof thereby permitting communication between the interior of the inner tube and the space within the cylindrical portion of the shell at the forward end of the piston whereby the position of the piston is dependent upon the air pressure within said space, the slotted portion of the shell being provided with scale markings with which the piston can coöperate whereby a reading of the pressure within the tube is readily made, the inner tube being adjustably mounted so that it can be positioned to open the air valve whereby the pressure within the tube can be ascertained and so that the inner tube can be moved to a position that will permit the air valve to remain normally closed.

3. In combination with the stem of a tire which stem has an air valve for normally closing the opening of the stem against the flow of air from the tire, a pressure gage comprising a barrel having on the exterior thereof scale markings, said barrel having a cylindrical portion, a nut at the upper end of said barrel, an inner tube screwed into said nut, which tube extends through said cylindrical portion, a piston located within said cylindrical portion, and a compression spring the lower end of which engages the rear side of the piston, said piston being provided at its forward end with an annular washer U-shaped in cross-section, the pressure gage being constructed so that air within the tire can exert, when the air valve is open, its full pressure within the chamber at the forward end of the piston and so that no air that is in the chamber above the piston can escape to the atmosphere, the inner tube being adjustable whereby it can be employed to open the air valve which is normally closed.

4. In combination with the stem of a tire having an air valve for normally closing the passage in said stem, a pressure gage having a cylinder connected to the stem, an inner tube, a piston surrounding said tube and within said cylinder, and means for adjusting said tube along said cylinder to a position where said tube can hold the air valve open.

5. A pressure gage for tires, said gage having a cylinder, means for securing said cylinder to a tire valve stem, an inner tube within said cylinder through which tube air for the tire can pass, means for adjusting said tube along said cylinder whereby said tube can force a valve within the stem to open position, a piston within said cylinder and surrounding said inner tube, and means coöperating with said piston whereby a reading can be had of the pressure exerted against the end of the piston.

6. A pressure gage comprising a cylinder, and having means for securing the cylinder to a valve stem of a tire, an inner tube, an adjusting cap for moving said tube relative to said cylinder to a position where the tube can force a valve within the valve stem to open position, a piston surrounding said tube and located within the cylinder, and a compression spring engaging the rear side of said piston tending to force the piston forwardly, which piston is constructed so as to oppose leakage from the space at the forward end of the piston past the latter, the adjusting cap being provided with a screw connection whereby air can be supplied to the tire through the inner tube.

7. A pressure gage for pneumatic tires, said gage comprising in combination a barrel or cylinder, a central stem located within said barrel or cylinder, and a piston fitting the space between said stem and said barrel or cylinder, said stem being movable longitudinally relative to said barrel or cylinder from a position where said stem permits an air valve of the tire to normally remain closed to a position where the stem will open the valve.

8. A pressure gage for determining the pressure within a tire, when said gage is in coöperation with a stem of the tire within which stem a valve is located, said pressure gage comprising in combination a barrel or cylinder, an adjustable central stem, and a piston surrounding said adjustable central stem and located within said barrel, said adjustable central stem being movable when the gage is in position on the stem of the tire to a position where the adjustable central stem will open said valve whereby the pressure gage will be brought into operation, said central stem also being movable away from said valve whereby the latter will be allowed to close.

9. In combination with a stem of a pneumatic tire, which stem has therein an air valve that normally closes the passageway of the stem, a pressure gage comprising a casing which is connected to the stem, an inner member within said casing, a spring-pressed plunger fitting the interior of the casing and the exterior of said inner member, and means carried by said casing, said means in turn carrying the inner member, said inner member being mounted so that it is longitudinally adjustable toward the air valve so as to effect an opening of the passageway and also being movable away from said air valve whereby the air valve can assume the position that it occupies when normally closing said passageway.

This specification signed and witnessed the 26 day of July, A. D. 1915.

EVARTS G. LOOMIS.
ARTHUR V. DA COSTA.

Signed in the presence of—
LILLIAN M. SUMMERS,
MAX INSEL.